United States Patent
Lam

(10) Patent No.: US 9,756,110 B2
(45) Date of Patent: Sep. 5, 2017

(54) SYSTEMS AND METHODS FOR OPTIMIZING WEB PAGE LOAD TIME

(71) Applicant: salesforce.com, inc., San Francisco, CA (US)

(72) Inventor: Chun Tak Lam, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 390 days.

(21) Appl. No.: 14/512,205

(22) Filed: Oct. 10, 2014

(65) Prior Publication Data

US 2016/0103803 A1  Apr. 14, 2016

(51) Int. Cl.
   H04L 29/08   (2006.01)
   G06F 17/30   (2006.01)

(52) U.S. Cl.
   CPC ........ *H04L 67/02* (2013.01); *G06F 17/30902* (2013.01)

(58) Field of Classification Search
   CPC .................... H04L 67/02; G06F 17/30902
   See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |

(Continued)

OTHER PUBLICATIONS

Referencing a Static Resource in Visualforce Markup, https://salesforce.com/us/developer/docs/pages/Content/pages_resources_reference.htm, 2014, (retrieved Sep. 9, 2015), 2 pages.

(Continued)

*Primary Examiner* — Viva Miller
(74) *Attorney, Agent, or Firm* — Haynes Beffel & Wolfeld LLP; Ernest J. Beffel, Jr.

(57) ABSTRACT

The technology disclosed relates to systems and methods for using deduplication when rendering complex web pages with multiple iFrames, to improve performance and reduce memory requirements. We refer to the technology disclosed as "server-side rework" of interface web pages with multiple iFrames by post processing. Custom interface web pages with multiple iFrames can use the disclosed server-side rework to post-process complex interface web pages for improved performance and reduced memory requirements.

22 Claims, 11 Drawing Sheets iFrame Accelerator Environment

(56) References Cited

U.S. PATENT DOCUMENTS

| | | |
|---|---|---|
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0299857 A1* | 12/2007 | Gwozdz ............ G06F 17/30899 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0005048 A1* | 1/2010 | Bodapati ........... G06F 17/30303 |
| | | 706/47 |
| 2011/0082829 A1* | 4/2011 | Kolovski ............... G06N 5/046 |
| | | 706/55 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0247216 A1 | 9/2013 | Cinarkaya et al. |
| 2013/0290645 A1* | 10/2013 | Van De Ven ....... G06F 12/0284 |
| | | 711/147 |
| 2014/0108667 A1* | 4/2014 | Reddy ............... G06F 17/30873 |
| | | 709/228 |
| 2016/0191598 A1* | 6/2016 | DeFrancesco ..... G06Q 30/0277 |
| | | 709/219 |

OTHER PUBLICATIONS

Singh, Sarvjeet, et al., "Orion 2.0: Native Support for Uncertain Data," Purdue University, Department of Computer Science, Copyright Jun. 9-12, 2008, 3 pages.

(56) References Cited

OTHER PUBLICATIONS

Window.top, https://developer.mozilla.org/en-US/docs/Web/API/Window.top. 2014, 2 pages.

* cited by examiner

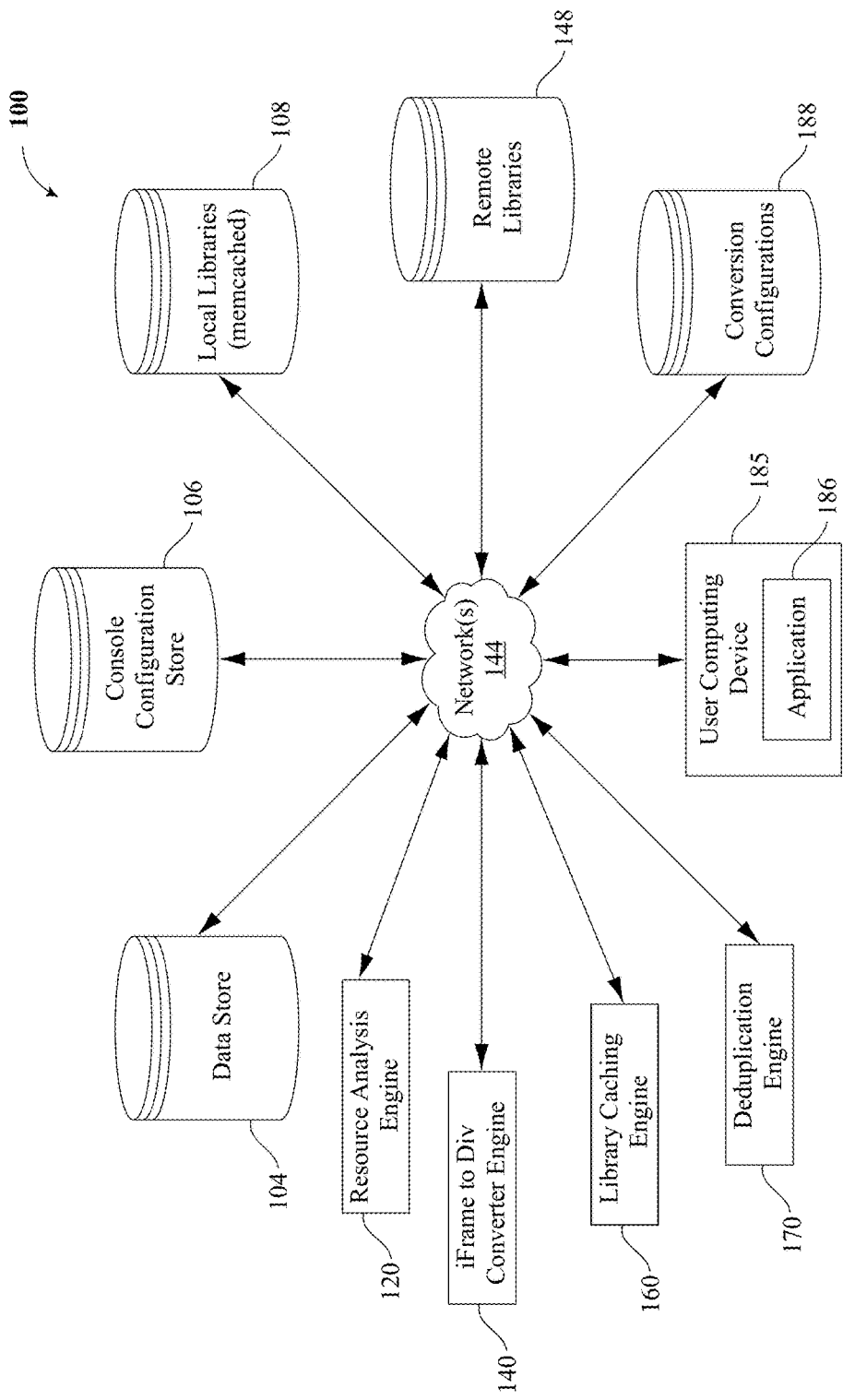
FIG. 1 – iFrame Accelerator Environment

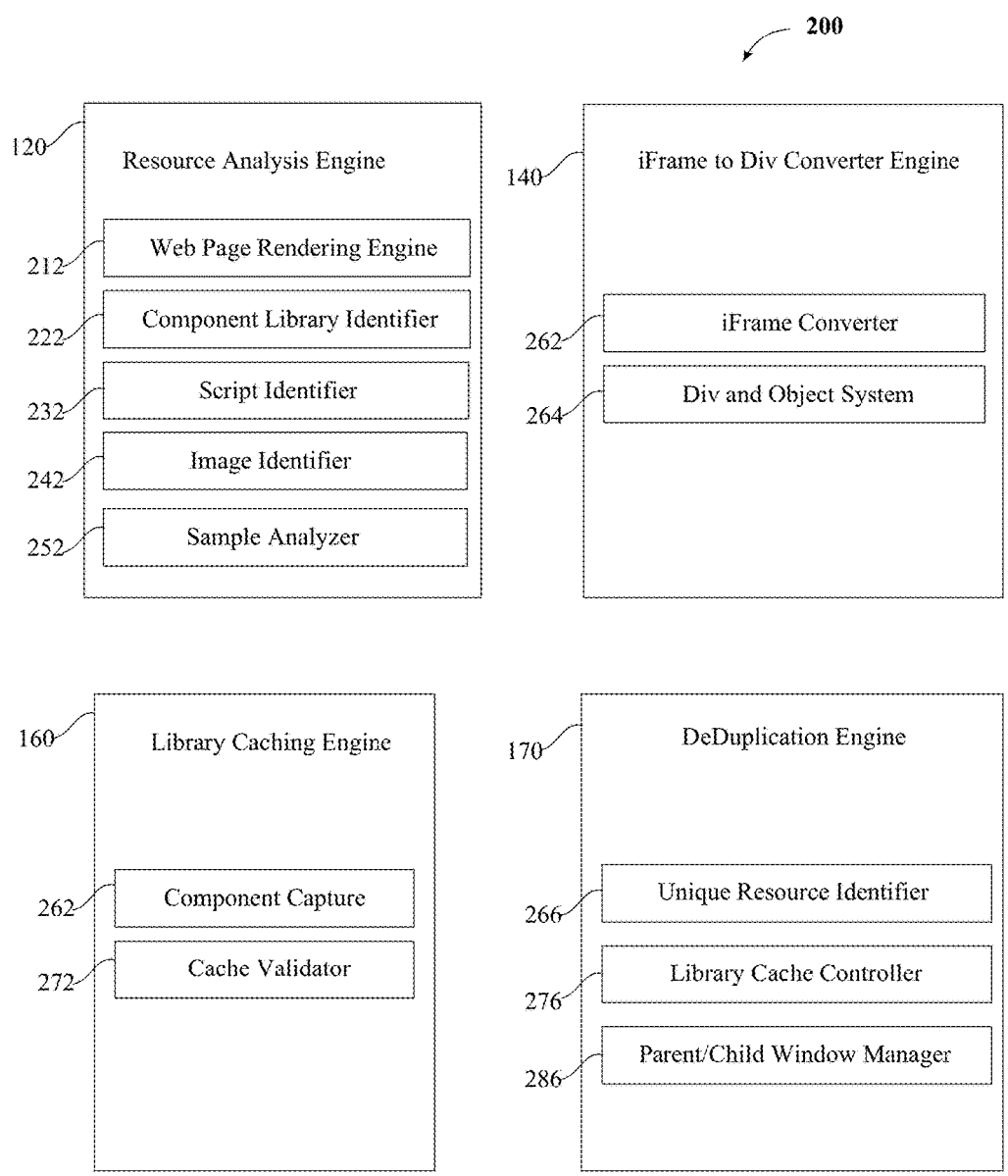
FIG. 2 – Accelerator Components

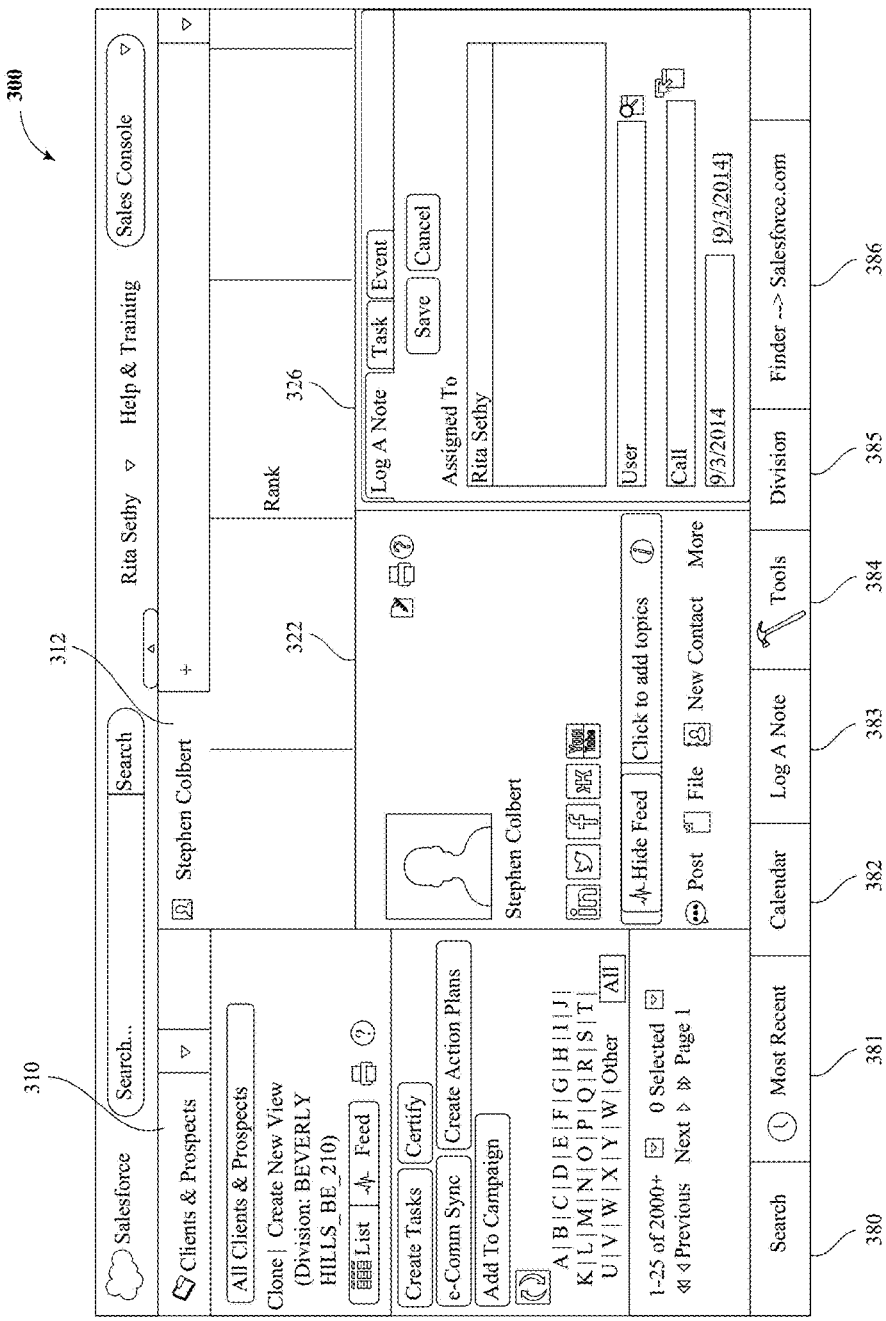
FIG. 3 – iFrame Interface

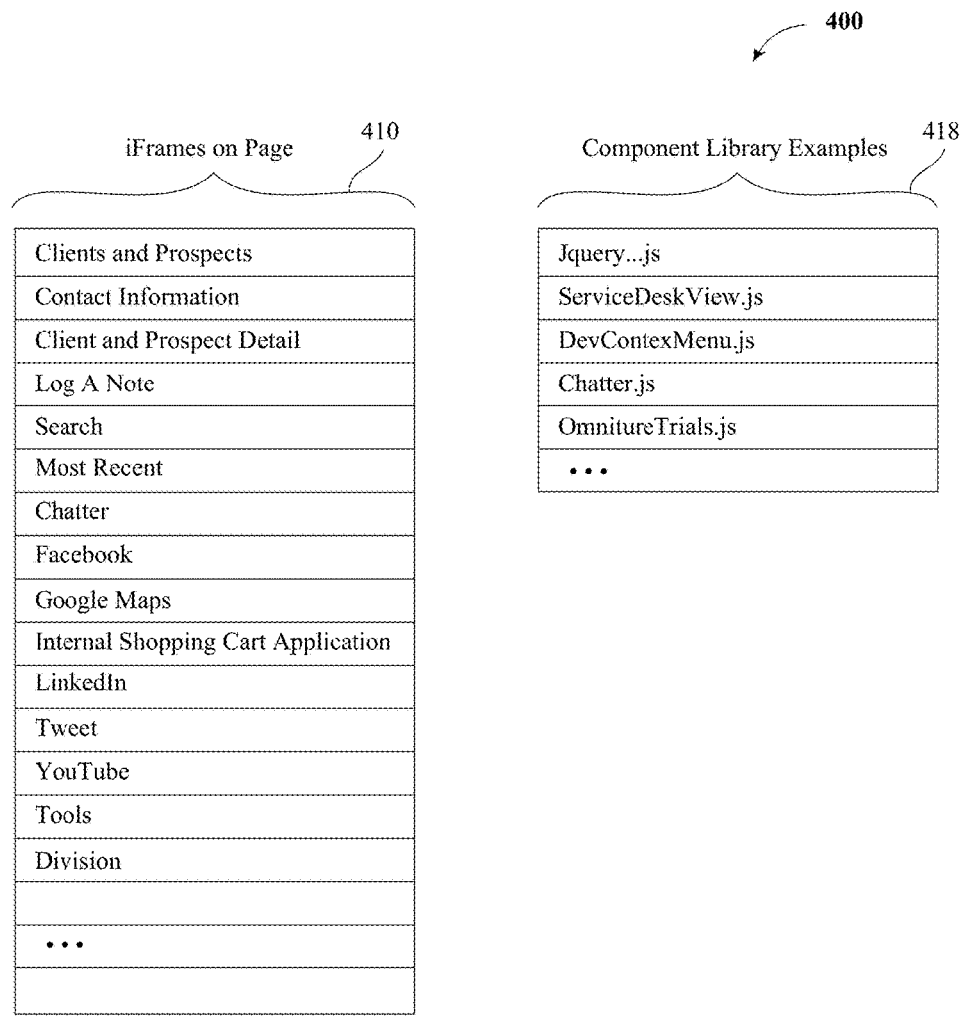
FIG. 4 – iFrames Web Page and Component Libraries

| | | jQuery loads | Initiator iFrames |
|---|---|---|---|
| 520 | 1 | jQuery-1.9.1.min.js | Search |
| 530 | 2 | jQuery191 | ConsoleTools |
| 540 | 3 | jQuery191 | DivisionSelect |
| 550 | 4 | jQuery-ui.js | TaskCreate |
| 560 | 5 | jQuery191 | Servlet.integration |
| 570 | 6 | jQuery-1.9.1.min.js | Servlet.integration |

FIG. 5 – jQuery Library Loads

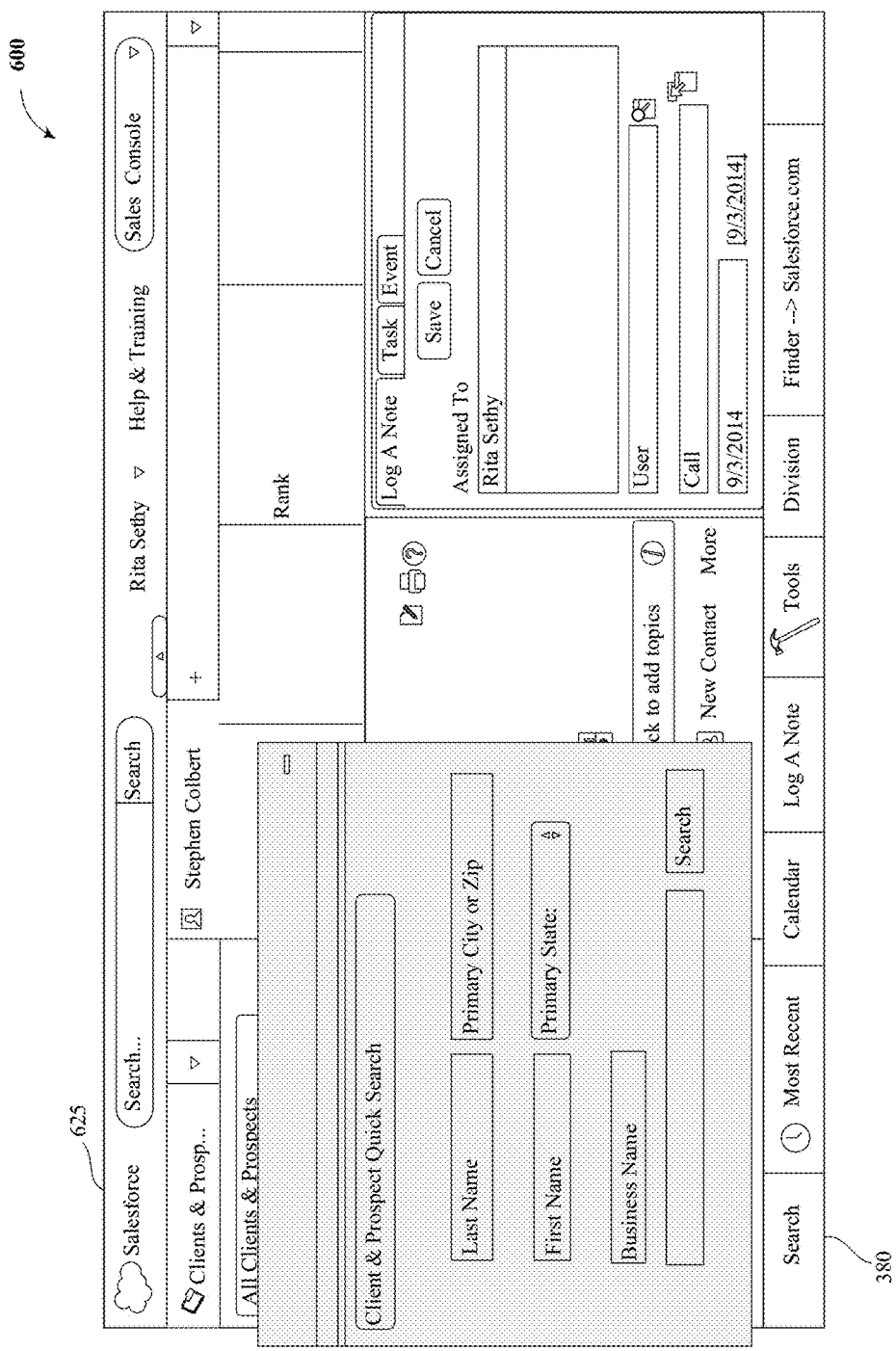
FIG. 6 – Search Popup Window

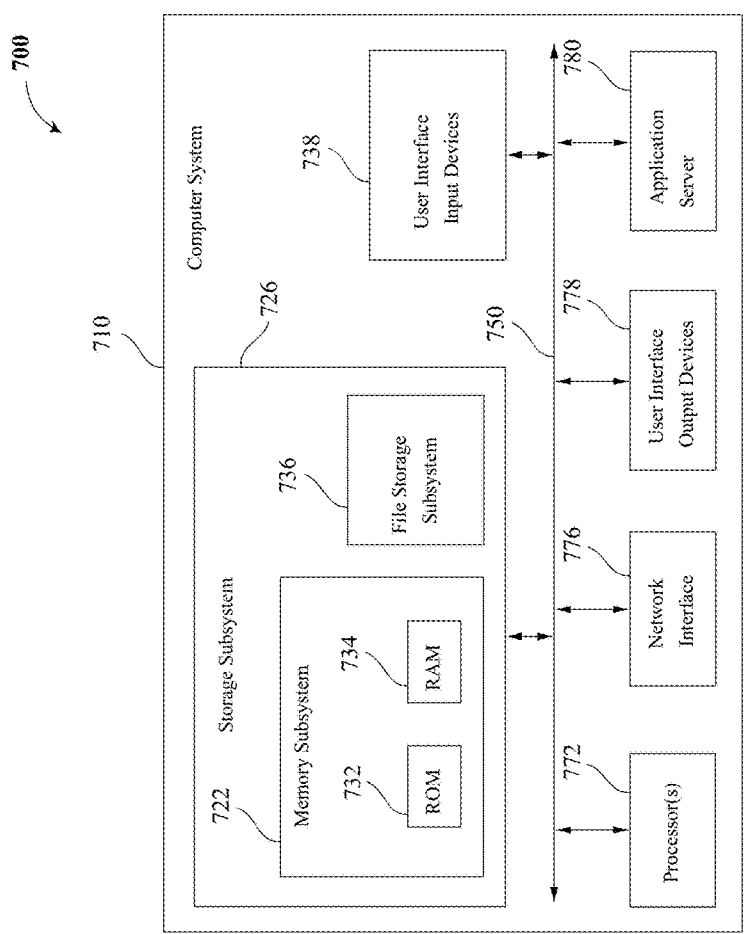
FIG. 7 – Computer System

FIG. 8 – Search Popup and iFrame Code Snippet

FIG. 9 – Search Popup and Div Code Snippet

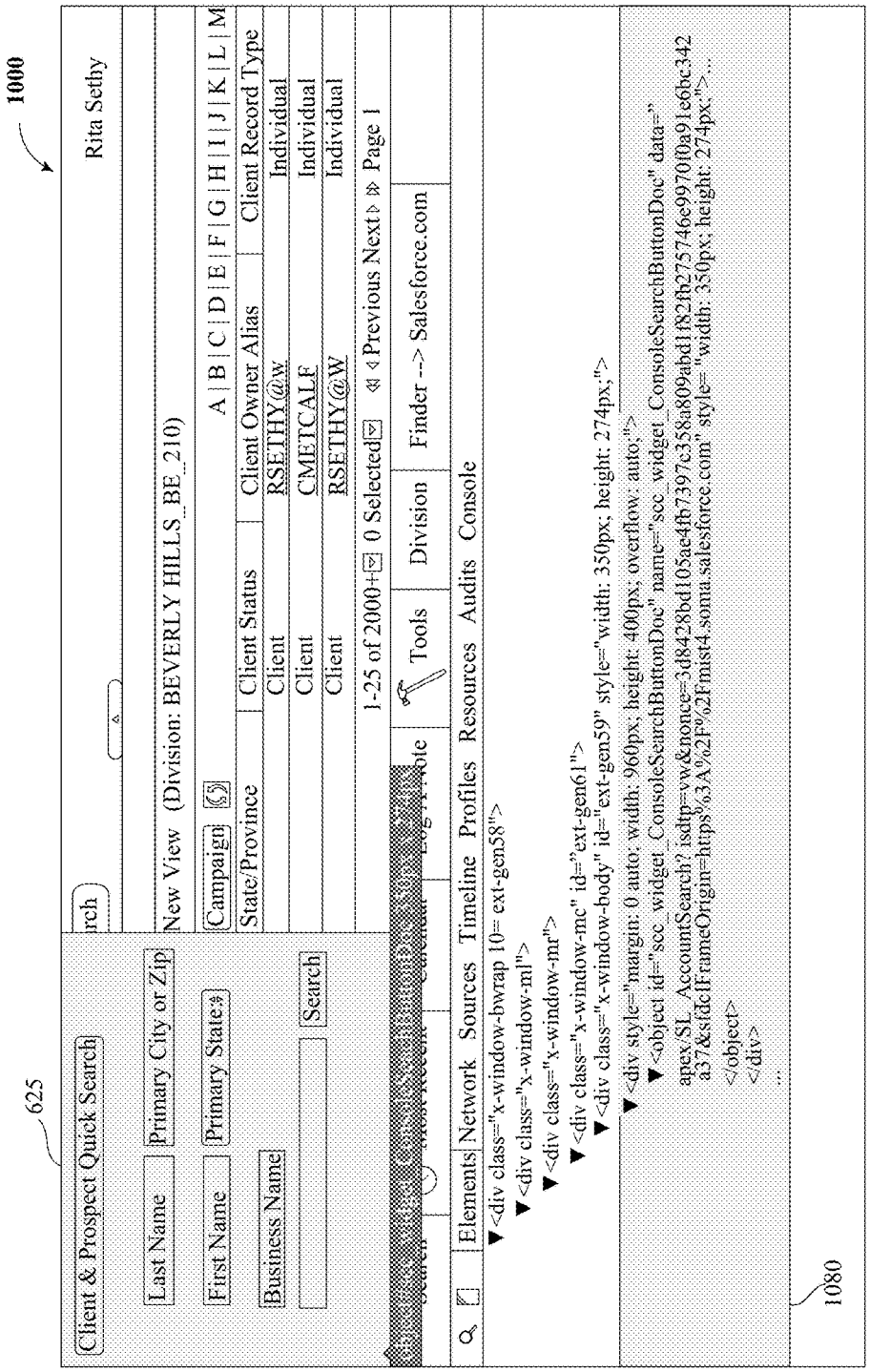
FIG. 10 – Search Popup and HTML Div with Object Code Snippet

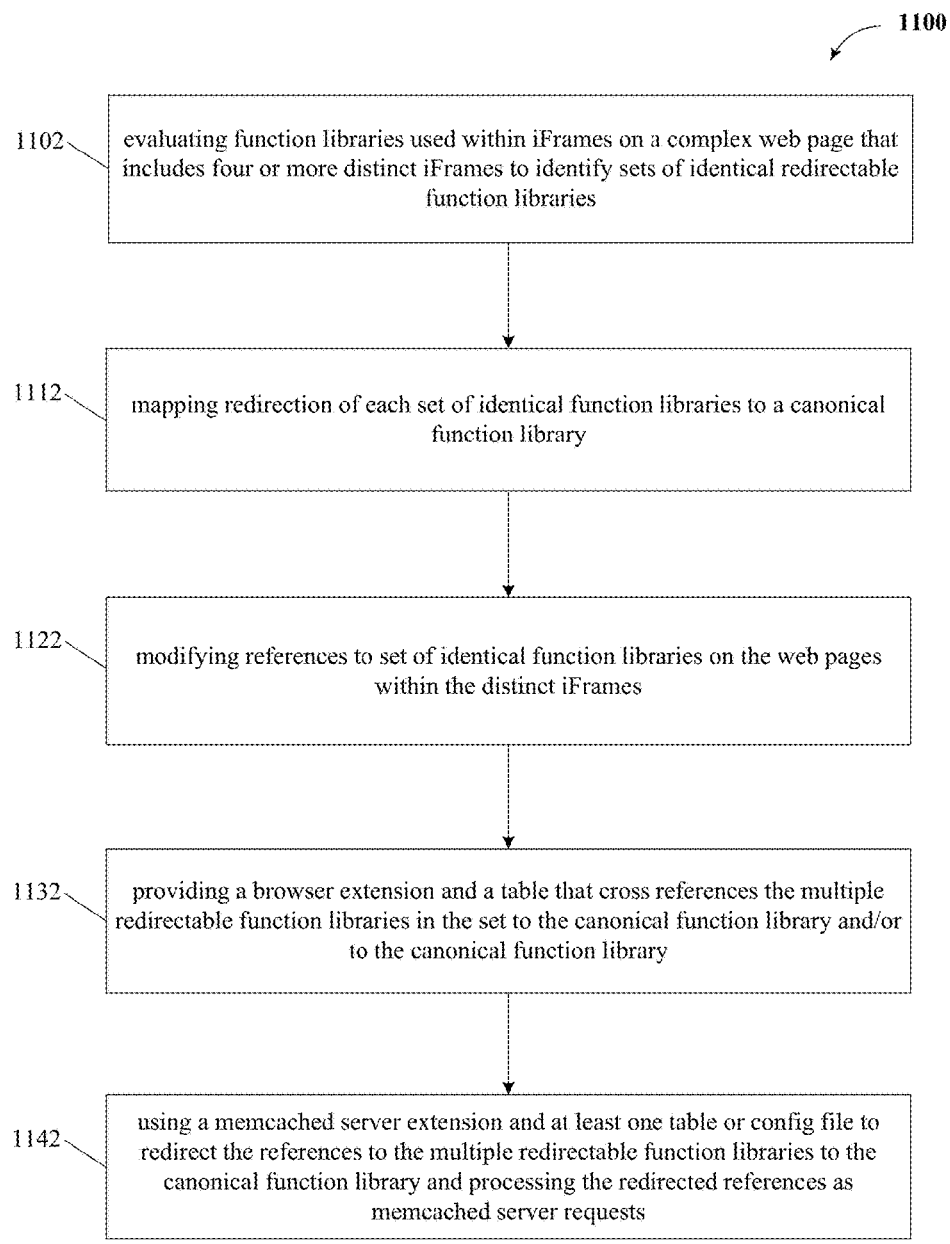
FIG. 11 – Improving Rendering Performance of Complex Web Pages

SYSTEMS AND METHODS FOR OPTIMIZING WEB PAGE LOAD TIME

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

The technology disclosed relates to systems and methods for optimizing web page load time using deduplication based on component metadata, to improve performance and reduce memory requirements when rendering complex web pages with multiple iFrames. We refer to the technology disclosed as "server-side rework" of interface web pages with multiple iFrames by post processing. The terminology "server-side rendering" has been used to describe other technology, so we adopt "server-side rework." Custom interface web pages with multiple iFrames can use the disclosed server-side rework to post-process complex interface web pages for improved performance and reduced memory requirements.

An iFrame is a powerful HTML element that allows embedding of one web page within another web page. Use of iFrames is popular in the development of customer relation management (CRM) interfaces, in part because iFrames support mash ups between software provided by a CRM vendor and other sources of information. That is, a web application can use content from more than one source to create a single new service displayed in a single graphical interface. For example a healthcare application platform could connect conversations, care providers, clinical and administrative systems such as electronic medical records, and even external devices like glucose monitors, to create a care management interface. A complex web page that includes four or more iFrames can be unwieldy, slow to load, and clumsy as it updates.

An opportunity arises to improve runtime globally across a wide spectrum of user computing devices using deduplication based on tenant-specific metadata. An example use for the disclosed deduplication systems and methods includes rendering complex web pages with four or more iFrames efficiently to improve a user's browsing experience. The disclosed deduplication technology also improves application interface runtime on mobile devices. Improved customer experience and engagement, higher customer satisfaction and retention, and greater sales may result.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 1 shows an example page load accelerator environment for optimizing rendering and delivery of console web pages that use component libraries.

FIG. 2 shows example block diagrams for components of the accelerator environment.

FIG. 3 is an example console GUI implemented with iFrames.

FIG. 4 shows an example list of iFrames on a web page, such as the console GUI in FIG. 3, and an example list of component libraries that could be shared among the listed iFrames.

FIG. 5 shows a list of examples of jQuery library loads in which multiple instances of the same resource library are loaded.

FIG. 6 shows an example search popup window for a console web page.

FIG. 7 is a block diagram of an example computer system capable of using deduplication when rendering complex web pages with multiple iFrames.

FIG. 8 shows an example search popup and the code snippet used to implement the popup using an iFrame.

FIG. 9 shows an example search popup and the code snippet used to implement the popup using a div.

FIG. 10 shows an example search popup and the code snippet using an HTML div element coupled with an object tag embedded in the console web page.

FIG. 11 shows an example flow chart of redirection implementations.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Complex web page consoles that mash up web pages using multiple iFrames can be unwieldy, slow to load, and clumsy to update, as mentioned above. One cause of this is duplication of resources used by multiple iFrames in the console. Some resources such as JQuery.js and logo images are often repeated multiple times, as are some cascading style sheets (CSS). A console analyzer that automatically detects duplication of resources can implement consolidation of the web page resources. Automated analysis is beneficial when independent development groups update web pages in the multiple iFrames without release coordination.

The technology disclosed can include duplication analysis on a predetermined cycle, such as daily or hourly. It can include more frequent incremental analysis, such as hourly or every five minutes, that evaluates whether web pages in the multiple iFrames have changed since the last analysis. Re-analysis can be triggered by detection of a change. The change can either be in the source of the web pages or in a list of resources extracted from the web pages. This incremental analysis approach also can be applied on behalf of a particular user based on usage criteria, such as every tenth or twentieth user request to the console.

The technology disclosed can respond to detection of duplicate resources in a variety of ways. Server side rework can modify references to resources so that web page code directs resources to abridging HTML web page that causes loading of a canonical, sharable resource. Browser or app side rework can use a table associated with the console to redirect multiple requests for an identical resource to a canonical resource. Or, a browser or app cache can be provided that recognizes, from analysis, that a cached canonical resource can be returned in response to a variety of URLs or URIs that would otherwise be resolved to multiple but identical instances of the resource. Similarly, a memcached server can be provided that recognizes, from analysis, which a cached canonical resource can be returned in response to a variety of URLs or URIs.

The stability of sharing resources among iFrames can be tested, proven or improved by server side test loading of consoles and constituent web pages by a real or emulated browser that catches any rendering errors that result from a sharing strategy.

A related server side rework technology that can respond to detection of duplicate resources is rewriting complex HTML web pages from <iFrame> to <div> containers. The rework is automated, avoiding human errors in a complex process and happening quickly enough to respond to unscheduled changes in component iFrames.

Optimization Environment

FIG. 1 shows an example iFrame accelerator environment 100 for web page load optimization that makes use of deduplication based on component metadata. The environment includes a data store 104 that has a directory stored therein which maps an identity for each console user to customer-specific services; a console configuration store 106 that includes a reference to the resources for rendering a console web page for specific users; and local libraries 108. Local libraries may be stored in a browser cache or may be memcached using a general-purpose distributed memory caching system. Alternatively local libraries 108 may be implemented using a hybrid between memcached and browser caching systems.

The accelerator environment also includes a resource analysis engine 120 for identifying component libraries and image attributes for console web page rendering. iFrame to div converter engine 140 converts iFrames to alternative code that implements the same functionality and features while redirecting references to each set of identical function libraries to a canonical function library. In HTML, <iFrame> and <div> tags delimit containers. The iFrame to div converter engine reworks an HTML page using div elements, or a combination of div elements coupled with object tags, to bring the web pages referenced by the iFrames onto the console page.

The accelerator environment includes network(s) 144, remote libraries 148, and a library caching engine 160 for caching resources identified by the resource analysis engine 120 in local libraries 108. User computing device 185, application 186, and conversion configurations 188 for iFrame to div support are also included in the accelerator environment. In other implementations, environment 100 may not have the same elements or components as those listed above and/or may have other/different elements or components instead of or in addition to, those listed above, such as a web server and template database. The different elements or components can be combined into single software modules and multiple software modules can run on the same hardware.

Resource analysis engine 120, iFrame to div converter engine 140, library caching engine 160, and deduplication engine 170 can be implemented using varying types of hardware including a workstation, server, computing cluster, blade server, server farm, or any other data processing system or computing device. Network or bus-based interprocess communication can be used to implement communication among engines and databases, consistent with data center design considerations that are beyond the scope of this disclosure.

In some implementations, resource analysis engine 120 can be communicably coupled to a user computing device 185 via different network connections, such as the Internet. In some implementations, iFrame to div converter engine 140 can be communicably coupled to a user computing device 185 via different network connections, such as a direct network link. In some implementations, library caching engine 160 and deduplication engine 170 can be communicably coupled to user computing device 185 via different network connections, such as the Internet or a direct network link.

Network(s) 144 is any network or combination of networks of devices that communicate with one another. For example, network(s) 144 can be any one or any combination of a LAN (local area network), WAN (wide area network), telephone network (Public Switched Telephone Network (PSTN), Session Initiation Protocol (SIP), 3G, 4G LTE, wireless network, point-to-point network, star network, token ring network, hub network, WiMAX, WiFi, peer-to-peer connections like Bluetooth, Near Field Communication (NFC), Z-Wave, ZigBee, or other appropriate configuration of data networks, including the Internet. In other implementations, other networks can be used such as an intranet, an extranet, a virtual private network (VPN), a non-TCP/IP based network, any LAN or WAN or the like.

Local libraries 108 can be implemented using a general-purpose distributed memory caching system. In some implementations, databases can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

In some implementations, user computing device 185 can be a personal computer, laptop computer, tablet computer, smartphone or other mobile computing device, personal digital assistant (PDA), digital image capture devices, and the like.

Application 186 can take one of a number of forms, including user interfaces, dashboard interfaces, engagement consoles, and other interfaces, such as mobile interfaces, tablet interfaces, summary interfaces, or wearable interfaces. In some implementations, it can be hosted on a web-based or cloud-based application running or can run on a local computing device such as a personal computer, laptop computer, mobile device, and/or any other hand-held computing device. It can also be hosted on a non-social local application running in an on premise environment. In one implementation, application 186 can be accessed from a browser running on a computing device. The browser can be Chrome, Internet Explorer, Firefox, Safari, Opera and the like. In other implementations, application 186 can run as an engagement console on a computer desktop application.

Local libraries 108 and remote libraries 148 include the common or canonical resources for console interfaces and other applications. Examples of the content of local libraries 108 include JavaScript, images, and cascaded style sheets (CSS). In one implementation, library resources are stored as computer readable code written in any programming language. Some examples of languages that can be used include C, AJAX, Python, C++, or JAVA. The software programs can be further translated into machine language or virtual machine instructions and stored in a program file in that form. The program file can then be stored on or in one or more of the articles of manufacture, according to other implementations.

The disclosed technology is discussed in the context of optimizing the rendering of a service cloud console, in which specific tenants embed different components in a console to show on a single screen. In this example, we illustrate use of one iFrame per component to render the console web page.

IFrames and Library Components

FIG. 3 shows an example console rendered using multiple iFrames. The console includes a Clients and Prospects iFrame 310 that provides the ability to view names, tagged as client or prospect, and selectable by the console user. A Contact Information iFrame 312 displays customer contact information. A Client and Prospect Detail iFrame 322 renders the center section of the console, and includes links to various example external applications such as Linked In, Twitter, Facebook, and YouTube. A Log a Note iFrame 326 renders the far right segment of the console—providing a mechanism for console users to set up tasks and events.

Along the lower strip of the console, 7 iFrames render 7 button options for console users. The Search button 380 triggers a popup search box 625 with a search interface for contacts, as shown in FIG. 6. We describe optimization of search below. The Most Recent button 381 triggers a popup list of recently accessed contacts, prospects or other objects that represent entities. The Calendar button 382 triggers a calendar popup. Log a Note button 383 activates the Log a Note iFrame 326. The Tools button 384 triggers a popup list of Tools for users. The Division button 385 shows regions of the world for a contact, and the Finder—Salesforce.com button 386 returns a console user to the home iFrame. The functionality of each button is rendered using a distinct iFrame. Within the Tools popup, additional iFrames support more functions.

FIG. 4 shows an example list of iFrames 410 for delivering a console web page and component library examples 418 to be used by one or more of the iFrames 410. Two examples of internal windows that use component libraries are Clients and Prospects, and Search. Examples of external windows include Facebook and Google Maps.

Some common resources are required by all the iFrames on a page. For example, jQuery is a JavaScript library designed to simplify the client-side scripting of HTML. FIG. 5 shows some of the jQuery resources 500 that would be downloaded to render the example console shown in FIG. 3. The Initiator iFrames 518 specifies which iFrame initiates a specific jQuery component download. For example, the Search button 380 iFrame initiated the request for jQuery-1.9.1.min.js 520. The Toots iFrame 384 initiated the request for jQuery191 530. Similarly each iFrame requests library components. A servlet integration component can extend the functionality of the server to provide the "glue" to ensure that console components mesh into a coherent web page; the servlet integration is responsible for jQuery downloads, 560 and 570. Note that multiple jQuery downloads have similar but differing version names. Since it is unlikely that versions of component libraries with differing names are identical, a download of each requested component library helps to ensure correct functionality. In some implementations, a deeper analysis could be performed, such as checking a circular redundancy code (CRC) or MD5 checkcode to determine if files are identical, despite having slightly different names.

Often the same library gets downloaded many times to render a console web page. The disclosed methods evaluate the use of component libraries, and consolidate downloads of function libraries used in distinct iFrames to solve the problem of duplicated downloads of the same library.

Analysis of Static Resource Use

Servers provide component resources that clients use to render a web page. Examples of static resources include component libraries, style sheets and images. Attributes of HTML tags that reference these static resources include the "src=" attribute, the "href=" attribute, and the "img=" tag. The src attribute defines a URI or location of the element being requested, be it an image, a script, or another web page. src is short for "source." The href attribute specifies the URL of the page to which the link goes. The img tag creates a holding space for a referenced image.

Before performing any optimizations for the web page, the disclosed resource analysis engine 120 determines which static resources are needed to render the page.

The component library identifier 222 shown in FIG. 2 searches for static resources invoked by a complex web page and its constituent iFrames. It identifies sets of identical redirectable function libraries that are referenced multiple times by distinct iFrames.

The source attribute or script identifier 232 parses HTML for script tags and the image identifier 242 parses for img instances to identify other static resources. For example, a Google engine typically uses the same libraries each time the Google homepage is delivered to a web page in a browser. The source attribute or script identifier 232 identifies "src=" or "href=" attributes and associated URL attributes for the libraries. A search for src attributes can produce a list of approximately 90% of the resources for delivering a page. An example of JavaScript required for rendering the home page, www.google.com, shows example src tags that would be identified as images that could be loaded once and then cached.

```
<body class="hp vasq"
onload="try{if(!google.j.b){document.f&
&document.f.q.focus( );document.gbq
f&&document.gbqf.q.focus( );}}
catch(e){ }if(document.images)new
Image( ).src='/images/nav_logo170.png'"........>
<script data-url="/extern_chrome/677700198bf7b1ab.js?
bav=or.r_qf" id="ecs"></script>
```

For situations in which the library components referenced on a complex web page shift over time, the static analysis described above can result in a quickly-outdated list of resources. In those situations, the technology disclosed includes a method of dynamic analysis to detect component libraries and other static resources that should be added to or updated in the reference list that was compiled via static analysis.

The resource analysis engine 120 performs static and dynamic analysis. The static analysis is performed periodically. The period can relate to how often components of a console change. The dynamic analysis can be performed at the outset of a session and then again at sampling intervals during a session.

The resource analysis engine 120 completes dynamic analysis—using a server-side rendering or parsing of the console web page by the web page rendering engine 212 to identify the required library resources for delivering the console to the client. When the page version changes, for instance when a new version of one of the page is deployed, the list of required library resources is regenerated.

The results of this dynamic analysis can be compared with the results from the static analysis to improve accuracy for the list of library components. For example, some library components may be dynamic enough that they will need to be loaded any time the console web page is delivered, while other components such as a company logo will rarely change, so will be loaded only the first time the web page is rendered for a customer using the console for a session. That is, library components that are stable over time can be cached and reused, saving load time when a web page is delivered to a user.

The disclosed technology includes sampling as a trigger of dynamic analysis. The sample analyzer 252 samples some subset of instances of requests by a user to interact via the application console, to determine what component libraries are in use. For example, the sample analyzer 252 can be configured to determine which component libraries are used to deliver the web page to be rendered. In one implementation, the sampling frequency may be one percent of mouse events on the console for a specific user. In another implementation the sampling frequency may be as high as twenty percent of mouse events on the console for a user. The number of samples depends on the sampling method. In some implementations, such as asynchronous logging, the sample analyzer 252 may track every request.

The disclosed technology includes analysis options. The resource analysis engine 120 can combine the results of static analysis, dynamic analysis, and sampling analysis to compile an accurate reference for the resource files used to render a console web page. That information is stored for use by the deduplication engine 170. Examples of storage formats include XML (extensible Markup Language), GPB (Google Protocol Buffers), CSV (comma separated values), JSON (JavaScript Object Notation), BSON (Binary JSON), TOML (Tom's Obvious, Minimal Language), and YAML (Yet Another Markup Language).

An example XML format for identifying libraries used with a complex web page:

```
TestPage.xml
<Page: TestPage.page>
<Resource>TestImage</Resource>
<Resource>MyJavascriptFile</Resource>
<Resource>JQuery.js</Resource>
<Resource>Main.js</Resource>
....
</Page>
```

These XML statements are stored for the currently used library components. When a component changes, such as when a web page console design changes, the resource analysis engine 120 computes updated metadata, adding new resources to the test page, and to the xml.

Deduplication

After the resource analysis engine 120 completes an analysis of component library usage, the unique resource identifier 266—in the deduplication engine 170—identifies a reference of unique resources for the components used to render and deliver a web page console. An example of the deduplication process shows the libraries needed by each component of a web page console.

Component 1 requires JS1, JS2, and CSS1
Component 2 requires JS1, JS3, and CSS1
Component 3 requires JS1, JS2, and CSS2
Component 4 requires JS2, CSS1, and CSS2

The unique resource identifier 266 identifies the unique components for rendering the console as JS1, JS2, JS3, CSS1, and CSS2. Then the library cache controller 276 provides the unique component reference list to the library caching engine 160, For optimization, in some implementations the deduplication engine 170 can run during application 186 startup. Then, the library caching engine 160 can cache the identified components in local libraries 108 to reduce the number of times component libraries must be fetched from remote libraries 148, mapping redirection of each set of identical function libraries to a canonical function library.

Any change to the console setup will invalidate the local libraries cache. If invalidated, then the deduplication engine 170 will run again and the library caching engine 160 will capture the current components to be used for rendering the console. At run time, when we render a console for a user who interacts with an application 186 on a user computing device 185, we can fetch from the local libraries 108, loading the canonical function library—the unique set of resources that are needed by the different components. The first user after a change to the console setup may experience a slower web page delivery due to the deduplication engine 170, and later users will receive the benefit of pre-loaded components, and consequently a faster rendering and delivery of the web page console.

Reworking and other Redirection Technologies

Server-side rework can simplify delivery by redirecting redundant resource requests. In addition, in some implementations, <iFrame> containers can be reworked into <div> containers. In one implementation, a rework method improves load performance by using a top or parent window load required resources just once. Several strategies are described for sharing the once loaded resources among child windows, instead of the child windows loading their own copies of the resources. In another implementation, we identify potential conversions from iFrame to div to dynamically simplify delivery by substituting HTML div containers for iFrames in HTML code sent to client browsers.

Window.Parent or Window.Top Method

A browsing context has its own session history and active document. The HTML iFrame element and HTML inline frame element represent nested browsing contexts, effectively embedding another HTML page into the current page. The browsing context that contains the embedded content is called the parent browsing context. The top-level browsing context, which has no parent, is typically the browser window. Window.parent is a reference to the parent of the current window or subframe. If a window does not have a parent, its parent property is a reference to itself. When a window is loaded in an iFrame, object, or frame, its parent is the window with the element embedding the window. When within a frame, window refers to the current frame, parent refers to the parent of the current frame, and top refers to the outermost frame. Window.top returns a reference to the topmost window in the window hierarchy.

In our example console, we show windows that are rendered using a single iFrame per window. Parent refers to the console browser window that opens child windows (iFrames) that implement various components of the console, such as a search popup window. FIG. 6 shows the search button 380, and the resulting search popup window 625 that appears on the console web page as a result of the search button being selected by a console user.

To improve the outcome based on the results of the disclosed analysis technology, the parent/child window manager 286 determines how many layers of nested iFrames are used to render a console web page. The parent/child window manager 286 loads references to unique library component resources in the parent window (the console iFrame), and modifies the paths in child window iFrames to use a relative path to access the parent window resources. In this way, we only load the resources once and they are shared by all child windows instead of each child window retaining their own copy. That is, distinct iFrames include an HTML parent that redirects resolution of the references to the identical function libraries to the canonical function library reference on a parent web page. The parent/child window manager 286 adds a canonical function library reference to the parent web page.

Shown below is example code for rendering the search popup window, before implementation of the parent/child window manager 286. In this example, child window iFrames use their own local library component references, and download their library components separately from any components downloaded by the parent console window iFrame.

```
<iFrame id="scc_widget_ConsoleSearchButtonDoc"
name="scc_widget_ConsoleSearchButtonDoc"
scrolling="no" frameborder="0"
src="/apex/SL_AccountSearch?isdtp=vw&
nonce=ecaa4670ebd72e5c74935a0b0a16
2ca1bbec9fa86b4915e16d40c5d6158e7b9c&
sfdcIFrameOrigin=https%3A%2F%2Fi
st10.soma.salesforce.com" style="width: 350px;
height: 273px;"></iFrame>
.....
  <script>
  /*
   * Completely describes the individual metadata
   at all levels for the specified object.
   * @param objtype object type; e.g. "Account"
   * @param callback function to which response
   will be passed
   * @param [error=null] function to which jqXHR
   will be passed in case of error
   */
   remotetk.Client.prototype.describe = function(objtype,
     callback, error) {
       Visualforce.remoting.Manager.invokeAction
  ('SL_RemoteTKController.describe', objtype, function(result){
         handleResult(result, callback, error);
       }, {
         escape: false
       });
     }
   ...
   <script type="text/javascript">
   $j(document).ready(function( ) {
     sforce.console.addEventListener('openSearchButton',
     openButton);
     //set value of state dropdown to 'none'
     $j('#iBillingState').val('-1');
     ...
   </script><a href="javascript:%20void%280%29%3B"
   class="calToday"
   onclick="DatePicker.datePicker.selectDate('today');return
   false;">Today</a></div></div></div></body></html>
```

To redirect child window iFrames to use library component references stored in the parent window console iFrame, the child window iFrame code can be modified as shown in the example below:

```
<iFrame id="scc_widget_ConsoleSearchButtonDoc"
name="scc_widget_ConsoleSearchButtonDoc"
```

```
scrolling="no" frameborder="0"
src="/apex/SL_AccountSearch?isdtp=vw&
nonce=ecaa4670ebd72e5c74935a0b0a16
2ca1bbec9fa86b4915e16d40c5d6158e7b9c&
sfdcIFrameOrigin=https%3A%2F%2Fi
st10.soma.salesforce.com" style="width: 350px;
height: 273px;"></iFrame>
.....
  <script>
  /*
   * Completely describes the individual metadata
   * at all levels for the specified object,
   * @param objtype object type; e.g. "Account"
   * @param callback function to which response will be passed
   * @param [error=null] function to which jqXHR will be passed in
   case of error
   */
   remotetk.Client.prototype.describe = function(objtype,
     callback, error) {
Window.parent.Visualforce.remoting.Manager.invokeAction
  ('SL_RemoteTKController.describe', objtype, function(result){
         handleResult(result, callback, error);
       }, {
         escape: false
       });
     }
   .....
   <script type="text/javascript">
   $j(parent.document).ready(function( ) {
     Window.parent.sforce.console.addEventListener
     ('openSearchButton', openButton);
     //set value of state dropdown to 'none'
     $j('#iBillingState').val('-1');
     ...
   </script><a href="javascript:%20void%280%29%3B"
   class="calToday"
   onclick="DatePicker.datePicker.selectDate('today');return
   false;">Today</a></div></div></div></body></html>
```

Using the window.parent property causes the search button popup window iFrame to use the component library references in the parent window, so that only a single instance of each unique library component need be downloaded to render the console browser web page. By loading a single instance of each resource, load time and memory use are decreased.

Caching Redirection

Redirection can also be implemented by a browser or memchache, instead of by reworking web page code. One approach involves providing a browser extension and a table that cross references the multiple redirectable function libraries in the set to the canonical function library. This includes redirecting references looking up the multiple redirectable function libraries in the table and treating the tabled libraries as references to the canonical function library. These dynamically redirected references are processed as web page content.

Another implementation includes a browser cache extension and a table that cross references the multiple redirectable function libraries to the canonical function library. The modified browser cache looks up the multiple redirectable function libraries in the table and treats the tabled libraries as references to the canonical function library. When the canonical function library or other resource is available in cache, references to the multiple redirectable function libraries can be redirected and then processed as cache requests. A user or the user's organization can have a custom configuration file or table that cross references the multiple function libraries to the canonical function library.

References to function libraries can also be redirected using a memcached server extension and a table or configuration file, per tenant, that cross references redirectable function libraries to a canonical function library. The redirected references can be processed as memcached server requests.

Redirection as a browser or browser cache extension also can be applied to four or more tabs open in the same browser. The tabs can be within the same browser window instance or across browser window instances. One approach involves providing a browser extension and a table that cross references the multiple redirectable resources in the set to the canonical resources. Applied to tabs instead of iFrames, this approach involves dynamic analysis of the static resources, such as function libraries, used across a plurality of the tabs currently active. The tabs involved can be all of the tabs in use or limited to predetermined application tabs, such as CRM-related tabs. Using a table within a browser extension includes redirecting references by looking up the multiple redirectable resources in the dynamically compiled table and treating the tabled resources as references to the canonical resources. These dynamically redirected references are processed as web page content.

Another implementation includes a browser cache extension and a table that cross references the multiple redirectable resources to the canonical resources. The modified browser cache looks up the multiple redirectable resources in the table and treats the tabled resources as references to the canonical resources. When the canonical resource is available in cache, references to the multiple redirectable resources can be redirected and then processed as cache requests. A user or the user's organization can have a custom configuration file or table that cross references the multiple resources to the canonical resources.

iFrame to Div Method

Figure 8:
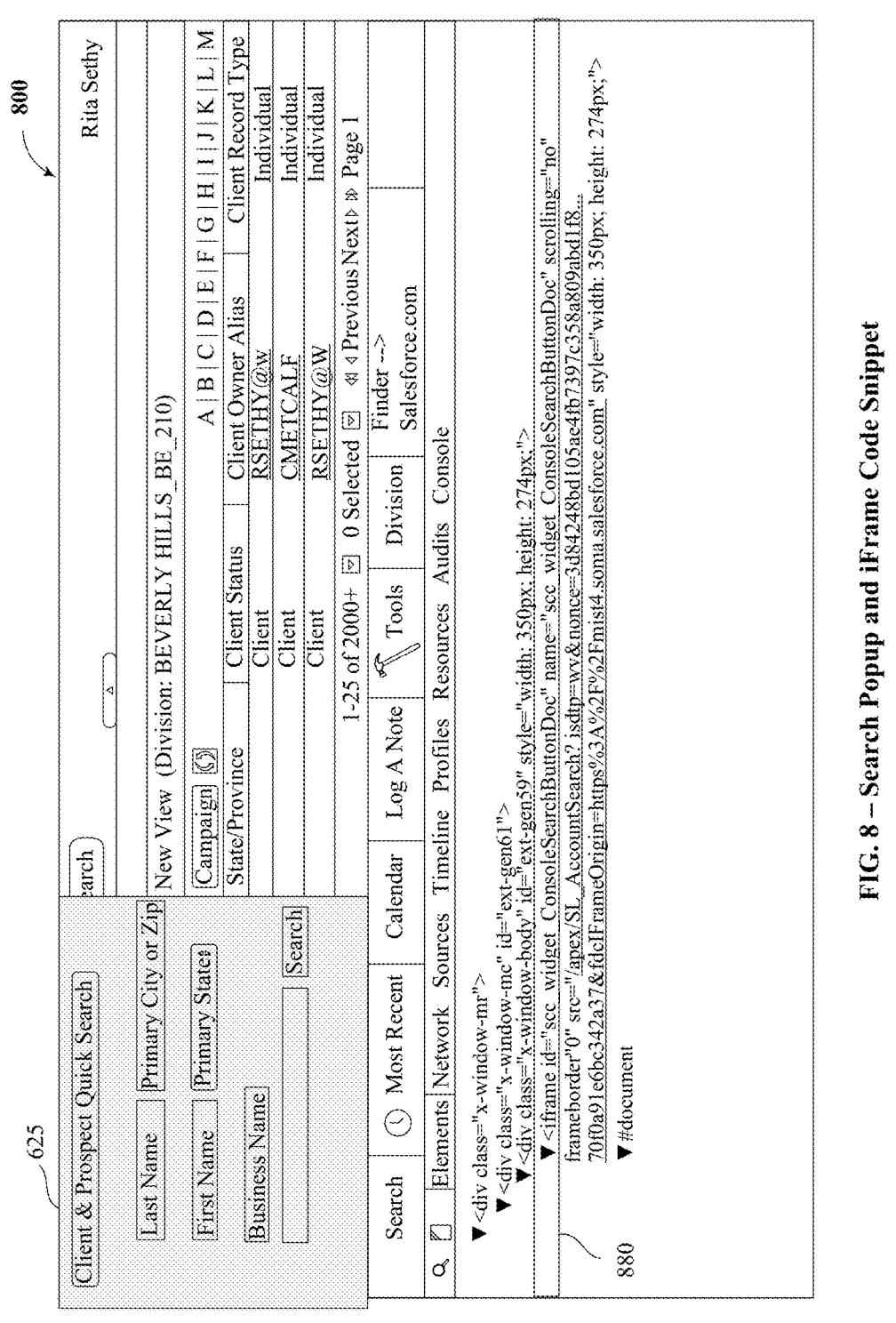

Server-side rework pre-renders constructs of the console, to simplify delivery. Configuration information gleaned from analysis of the library components of the console web page identifies components to de-duplicate when reworking code from iFrame to div containers. This conversion is a dynamic simplification that substitutes HTML div containers for iFrames in HTML code sent to client browsers. As an example, the iFrame to div converter engine 140 can convert the search popup 625 shown in FIG. 8 implemented as an iFrame 880 to a div. Listed below is a code snippet showing the search popup rendered using an iFrame.

```
<iFrame id="scc_widget_ConsoleSearchButtonDoc"
name="scc_widget_ConsoleSearchButtonDoc"
scrolling="no" frameborder="0"
src="/apex/SL_ AccountSearch?isdtp=vw&
nonce=3d84248bd105ae4fb7397c358a80
9abd1f82fb275746e9970f0a91e6bc342a37&
sfdcIFrameOrigin=https%3A%2F%2F
mist4.soma.salesforce.com" style="width: 350px;
height: 274px;"></iFrame>
```

Figure 9:
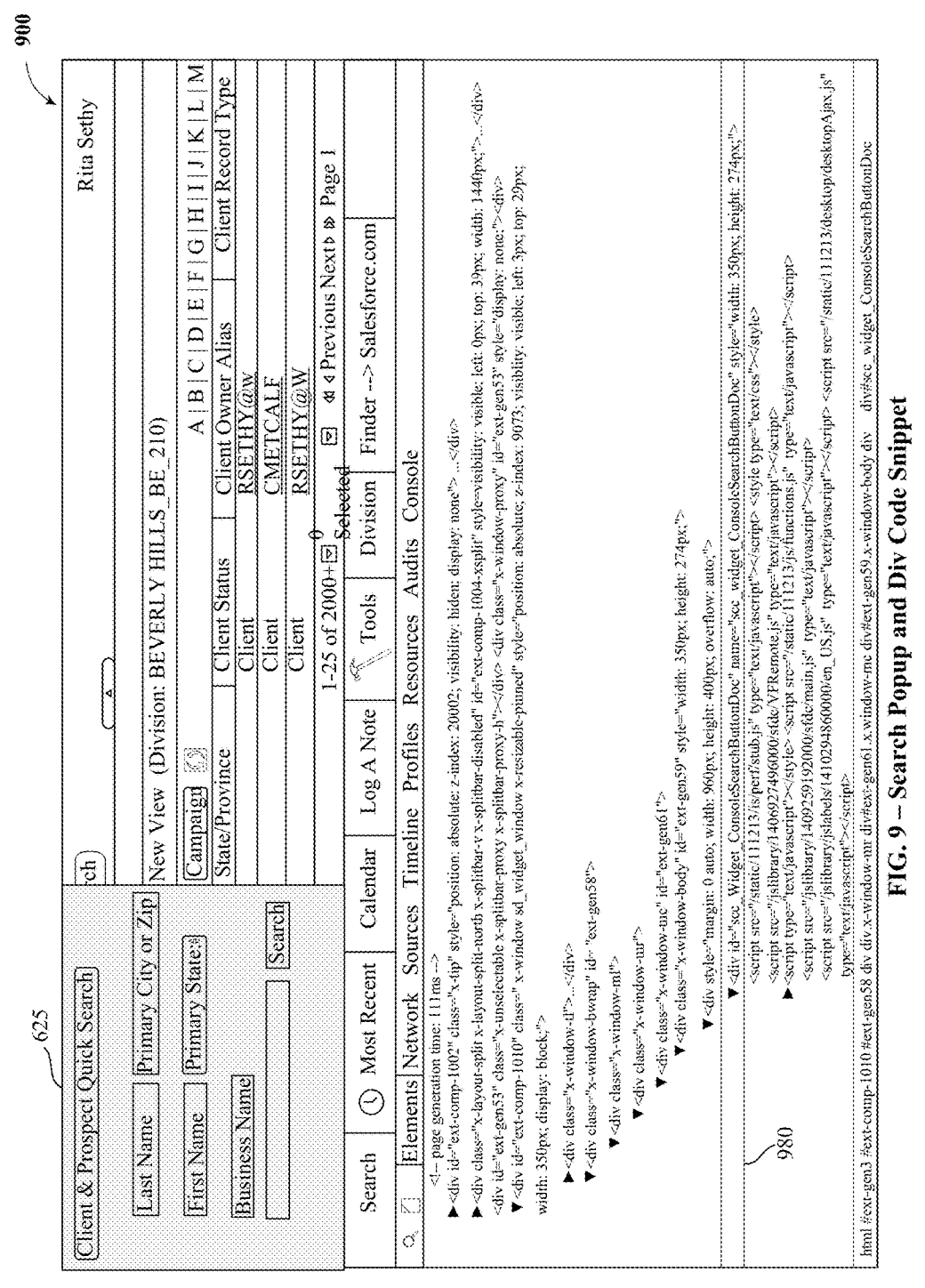

The iFrame converter 262 replaces an iFrame with an HTML div element, along with all of the code from the iFrame. An example of this option is shown in FIG. 9, though only the first few lines of the div 980, of many, of the code snippet are captured in the screenshot. The start tag of the div element for the search popup is shown below.

```
<div id="scc_widget_ConsoleSearchButtonDoc"
name="scc_widget_ConsoleSearchButtonDoc"
style="width: 350px; height: 274px;">
```

After the div start tag shown in the code snippet above, the original code from within the iFrame would be included, with the exception of header and body tags.

Alternatively, the div and object system 264 renders the search popup 625, shown in FIG. 10, using an HTML div element coupled with an object tag that defines the ConsoleSearchButtonDoc object 1080 embedded in the console web page. A code snippet showing the search popup rendered using a div element coupled with an object tag is shown below.

```
<div style="margin: 0 auto; width: 960px;
height: 400px; overflow: auto;">
<object id="scc_widget_ConsoleSearchButtonDoc"
name="scc_widget_ConsoleSearchButtonDoc"
data="/apex/SL_AccountSearch?isdtp=vw&
nonce=3d84248bd105ae4fb7397c358a8
09abd1f82fb275746e9970f0a91e6bc342a37&
sfdcIFrameOrigin=https%3A%2F%2F
mist4.soma.salesforce.com" style="width: 350px;
height: 274px;"></object>
```

Both conversion options render the same console search popup. Substitutions of HTML div containers and object tags for iFrames in HTML code sent to client browsers can be used to redirect requests for static resources—function libraries, CSS, and images—used by iFrames on a complex web page. This redirection of references for library components, CSS and images via code rewriting can reduce the number of resources to be loaded, thereby optimizing page load time and memory requirements.

Computer System

FIG. 7 is a block diagram of 700 an example computer system capable of using deduplication when rendering complex web pages with multiple iFrames. Computer system 710 typically includes at least one processor 772 that communicates with a number of peripheral devices via bus subsystem 750. These peripheral devices can include a storage subsystem 726 including, for example, memory devices and a file storage subsystem, user interface input devices 738, user interface output devices 778, and a network interface subsystem 776. The input and output devices allow user interaction with computer system 710. Network interface subsystem 776 provides an interface to outside networks, including an interface to corresponding interface devices in other computer systems.

User interface input devices 738 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include possible types of devices and ways to input information into computer system 710.

User interface output devices 778 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide anon-visual display such as audio output devices. In general, use of the term "output device" is intended to include all possible types of devices and ways to output information from computer system 710 to the user or to another machine or computer system.

Storage subsystem 726 stores programming and data constructs that provide the functionality of some or all of the modules and methods described herein. These software modules are generally executed by processor 772 alone or in combination with other processors.

Memory 722 used in the storage subsystem can include a number of memories including a main random access memory (RAM) 734 for storage of instructions and data during program execution and a read only memory (ROM) 732 in which fixed instructions are stored. A file storage subsystem 736 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 736 in the storage subsystem 726, or in other machines accessible by the processor.

Bus subsystem 750 provides a mechanism for letting the various components and subsystems of computer system 710 communicate as intended. Although bus subsystem 750 is shown schematically as a single bus, alternative implementations of the bus subsystem can use multiple busses. Application server 780 can be a framework that allows the applications of computer system 710 to run, such as the hardware and/or software, e.g., the operating system.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as one example. Many other configurations of computer system 710 are possible having more or fewer components than the computer system depicted in FIG. 7.

In some implementations, network(s) can be any one or any combination of Local Area Network (LAN), Wide Area Network (WAN), WiMAX, WiFi, telephone network, wireless network, point-to-point network, star network, token ring network, hub network, mesh network, peer-to-peer connections like Bluetooth, Near Field Communication (NFC), Z-Wave, ZigBee, or other appropriate configuration of data networks, including the Internet.

Improving Rendering Performance of Complex Web Panes

FIG. 11 shows an example flow chart 1100 of redirection implementations. Flowchart 1100 can be implemented at least partially with a database system, e.g., by one or more processors configured to receive or retrieve information, process the information, store results, and transmit the results. Other implementations may perform the actions in different orders and/or with different, fewer or additional actions than the ones illustrated in FIG. 11. Multiple actions can be combined in some implementations. For convenience, this flowchart is described with reference to the system that carries out a method. The system is not necessarily part of the method.

At action 1102, function libraries used within iFrames on a complex web page are evaluated. The function libraries that includes four or more distinct iFrames to identify sets of identical redirectable function libraries that are referenced in multiple distinct instances within the distinct iFrames.

At action 1112, redirection of each set of identical function libraries to a canonical function library is mapped. In one implementation, loading the complex web page includes loading the canonical function library instead of loading the multiple distinct instances of the identical redirectable function libraries in the distinct iFrames.

At action 1122, references to each set of identical function libraries on the web pages within the distinct iFrames are modified. In one implementation, the modifying includes prefixing the references to the identical function libraries with redirection to a bridging level HTML parent web page. The bridging level HTML parent web page includes references to the canonical function library and to the distinct iFrames.

In some other implementations, the modifying includes prefixing each of the references to the identical function libraries with a count of literal "parent." or a literal "top." or a reference derived from a "parent." or "top." function, in place of a longer URL location of a distinct instance of the library, that redirects the references to the identical function libraries to a bridging level HTML parent web page. The bridging level HTML parent web page reference to the canonical function library.

At action 1132, a browser extension and a table are provided that cross references the multiple redirectable function libraries in the set to the canonical function library. In some implementations, references to the multiple redirectable function libraries to the canonical function library are redirected and the redirected references are processed as web page content. In addition, a browser cache extension and a table are that cross references the multiple redirectable function libraries to the canonical function library.

At action 1142, references the multiple redirectable function libraries to the canonical function library are redirected and the redirected references are processed as cache requests. Further, used are a memcached server extension and at least one table or config file that cross references the multiple redirectable function libraries to the canonical function library and the references to the multiple redirectable function libraries to the canonical function library are redirected and the redirected references are processed as memcached server requests. In addition, the evaluation of the complex web page is performed before a session starts to cache the canonical function libraries and the evaluation of the complex web page is updated at the start of a session to update the cache of the canonical function libraries.

Particular Implementations

In one implementation, a computer-implemented method is described of improving rendering performance of complex web pages with four or more iFrames, including evaluating function libraries used within iFrames on a complex web page that includes four or more distinct iFrames to identify sets of identical redirectable function libraries that are referenced in multiple distinct instances within the distinct iFrames. This method further includes mapping redirection of each set of identical function libraries to a canonical function library. In one implementation, loading the complex web page includes loading the canonical function library instead of loading the multiple distinct instances of the identical redirectable function libraries in the distinct iFrames.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as optimization environment, iFrames and library components, analysis of static resource use, deduplication, reworking and other redirection technologies, iFrame to Div method, etc.

This method includes modifying references to each set of identical function libraries on the web pages within the distinct iFrames. In one implementation, the modifying includes prefixing the references to the identical function libraries with redirection to a bridging level HTML parent web page. The bridging level HTML parent web page includes references to the canonical function library and to the distinct iFrames.

One implementation includes a method of modifying references to each set of identical function libraries on the web pages within the distinct iFrames. In one implementation, the modifying includes prefixing each of the references to the identical function libraries with a count of literal "parent." or a literal "top." or a reference derived from a "parent." or "top." function, in place of a longer URL location of a distinct instance of the library, that redirects the references to the identical function libraries to a bridging level HTML parent web page. The bridging level HTML parent web page reference to the canonical function library.

This method also includes providing a browser extension and a table that cross references the multiple redirectable function libraries in the set to the canonical function library. It further includes redirecting references to the multiple redirectable function libraries to the canonical function library and processing the redirected references as web page content. In addition, it includes providing a browser cache extension and a table that cross references the multiple redirectable function libraries to the canonical function library.

This method also includes redirecting references the multiple redirectable function libraries to the canonical function library and processing the redirected references as cache requests. It further includes using a memcached server extension and at least one table or config file that cross references the multiple redirectable function libraries to the canonical function library and redirecting the references to the multiple redirectable function libraries to the canonical function library and processing the redirected references as memcached server requests. In addition, it includes performing the evaluation of the complex web page before a session starts to cache the canonical function libraries and updating the evaluation of the complex web page at the start of a session to update the cache of the canonical function libraries.

In another implementation, a computer-implemented method of improving rendering performance of a browser loaded with web pages in four or more tabs includes evaluating resources used within tabs of a browser loaded with four or more distinct web pages in respective tabs to identify sets of identical redirectable resources that are referenced in multiple distinct instances within the respective tabs. This method further includes mapping redirection of each set of identical resources to a canonical resource, whereby loading the complex web pages includes loading the resource instead of loading the multiple distinct instances of the identical redirectable resource in the respective tabs.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified.

One disclosed method includes providing a browser extension and a table that cross references the multiple redirectable function libraries in the set to the canonical resources. One method further includes redirecting references to the multiple redirectable resources to the canonical resources and processing the redirected references as web page content.

One method further includes providing a browser cache extension and a table that cross references the multiple redirectable function libraries to the canonical resources. The disclosed method further includes redirecting references the multiple redirectable resources to the canonical resources and processing the redirected references as cache requests.

Other implementations may include a non-transitory computer readable storage medium storing instructions executable by a processor to perform any of the methods described above. Yet other implementations may include a system including memory and one or more processors operable to execute instructions, stored in the memory, to perform any of the methods described above. And, a system built by combining computer hardware with computer readable storage medium storing instructions that, when executed, cause the computer hardware to perform any of the methods described above.

While the present technology is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the technology and the scope of the following claims.

What is claimed is:

1. A computer-implemented method of improving rendering performance of complex web pages with four or more iFrames, including:
    evaluating function libraries for rendering a complex web page including four or more distinct iFrames and that are used within the four or more distinct iFrames on the complex web page;
    identifying, from the evaluated function libraries, sets of identical redirectable function libraries that are referenced in multiple distinct instances within at least two iFrames of the four or more distinct iFrames;
    mapping a redirection of an identified set of identical redirectable function libraries to a single canonical function library, whereby loading the complex web page includes loading the single canonical function library instead of loading the multiple distinct instances of the identical redirectable function libraries of the identified set in the at least two iFrames of the four or more distinct iFrames;
    modifying references to the identified set of the identical redirectable function libraries on the complex web page, wherein the modifying includes prefixing the references to the identical redirectable function libraries of the identified set with a count of a literal "parent." or a literal "top." or a reference derived from a "parent." or "top." function, in place of a longer URL location of a distinct instance of a function library of the identified set, that redirects the references to the identical redirectable function libraries to a bridging level HTML parent web page; and
    providing, on the bridging level HTML parent web page, a reference to the single canonical function library.

2. The method of claim 1, further including modifying references to the identified set of the identical redirectable function libraries on the complex web page, wherein the modifying includes prefixing the references to the identical redirectable function libraries of the identified set with redirection to a bridging level HTML parent web page, and wherein the bridging level HTML parent web page includes references to the single canonical function library and to the at least two iFrames of the four or more distinct iFrames.

3. The method of claim 1, further including providing a browser extension and a table that cross references the identical redirectable function libraries of the identified set to the single canonical function library.

4. The method of claim 3, further including:
redirecting references to the identical redirectable function libraries of the identified set to the single canonical function library; and
processing the redirected references as web page content.

5. The method of claim 1, further including providing a browser cache extension and a table that cross references the identical redirectable function libraries of the identified set to the single canonical function library.

6. The method of claim 5, further including:
redirecting references to the identical redirectable function libraries of the identified set to the single canonical function library; and
processing the redirected references as cache requests.

7. The method of claim 1, further including:
using a memcached server extension and at least one table or config file that cross references the identical redirectable function libraries of the identified set to the single canonical function library;
redirecting references to the identical redirectable function libraries of the identified set to the single canonical function library; and
processing the redirected references as memcached server requests.

8. The method of claim 1, further including:
performing the evaluation before a session starts to cache the single canonical function library; and
updating the evaluation upon starting the session to update the cache of the single canonical function library.

9. A computer-implemented method of improving rendering performance of complex web pages with four or more iFrames, including:
evaluating resources for rendering a complex web page including four or more distinct iFrames and that are used within the four or more distinct iFrames on the complex web page;
identifying, from the evaluated resources, sets of identical redirectable resources that are referenced in multiple distinct instances within at least two iFrames of the four or more distinct iFrames;
mapping a redirection of an identified set of identical redirectable resources to a single canonical resource, whereby loading the complex web page includes loading the single canonical resource instead of loading the multiple distinct instances of the identical redirectable resources of the identified set in the at least two iFrames of the four or more distinct iFrames;
modifying references to the identified set of the identical redirectable resources on the complex web page, wherein the modifying includes prefixing the references to the identical redirectable resources of the identified set with one or more of a literal "parent." or a literal "top" or a reference derived from a "parent." or "top." function, in place of a longer URL location of a distinct instance of a resource of the identified set and wherein the prefixes redirect the references to the identical redirectable resources to a bridging level HTML parent web page; and
providing, on the bridging level HTML parent web page, a reference to the single canonical resource.

10. The method of claim 9, wherein the identical redirectable resources are static resources selected from a group including at least images and cascaded style sheets.

11. An apparatus improving rendering performance of complex web pages with four or more iFrames, comprising:
a computer including a processor;
a memory coupled to the processor, wherein the memory includes computer program instructions causing the computer to implement a process including:
evaluating function libraries for rendering a complex web page including four or more distinct iFrames and that are used within the four or more distinct iFrames on the complex web page;
identifying, from the evaluated function libraries, sets of identical redirectable function libraries that are referenced in multiple distinct instances within at least two iFrames of the four or more distinct iFrames;
mapping a redirection of an identified set of identical redirectable function libraries to a single canonical function library, whereby loading the complex web page includes loading the single canonical function library instead of loading the multiple distinct instances of the identical redirectable function libraries of the identified set in the at least two iFrames of the four or more distinct iFrames;
modifying references to the identified set of the identical redirectable function libraries on the complex web page, wherein the modifying includes prefixing the references to the identical redirectable function libraries of the identified set with one or more of a literal "parent." or a literal "top" or a reference derived from a "parent." or "top." function, in place of a longer URL location of a distinct instance of a resource of the identified set and wherein the prefixes redirect the references to the identical redirectable function libraries to a bridging level HTML parent web page; and
providing, on the bridging level HTML parent web page, a reference to the single canonical function library.

12. The apparatus of claim 11, further including computer program instructions causing the computer to implement a process including modifying references to the identified set of the identical redirectable function libraries on the complex web page,
wherein the modifying includes prefixing the references to the identical redirectable function libraries of the identified set with redirection to a bridging level HTML parent web page, and
wherein the bridging level HTML parent web page includes references to the single canonical function library and to the at least two iFrames of the four or more distinct iFrames.

13. The apparatus of claim 11, further including computer program instructions causing the computer to implement a process including providing a browser extension and a table that cross references the identical redirectable function libraries of the identified set to the single canonical function library.

14. The apparatus of claim 13, further including:
redirecting references to the identical redirectable function libraries of the identified set to the single canonical function library; and
processing the redirected references as web page content.

15. The apparatus of claim 11, further including computer program instructions causing the computer to implement a process including providing a browser cache extension and a table that cross references the identical redirectable function libraries of the identified set to the single canonical function library.

16. The apparatus of claim 11, further including computer program instructions causing the computer to implement a process including:
using a memcached server extension and at least one table or config file that cross references the identical redirectable function libraries of the identified set to the single canonical function library;
redirecting references to the identical redirectable function libraries of the identified set to the single canonical function library; and
processing the redirected references as memcached server requests.

17. The apparatus of claim 11, further including computer program instructions causing the computer to implement a process including:
performing the evaluation before a session starts to cache the single canonical function library; and
updating the evaluation upon starting the session to update the cache of the single canonical function library.

18. A computer-implemented method of improving rendering performance of a browser loaded with web pages in four or more distinct tabs, including:
evaluating resources for rendering four or more distinct web pages in the four or more distinct tabs of the browser and that are used in the four or more distinct web pages;
identifying, from the evaluated resources, sets of identical redirectable resources that are referenced in multiple distinct instances within at least two tabs of the four or more tabs;
mapping a redirection of an identified set of identical redirectable resources to a single canonical resource, whereby loading the four or more distinct web pages includes loading the single canonical resource instead of loading the multiple distinct instances of the identical redirectable resources of the identified set in the at least two tabs of the four or more distinct tabs;
modifying references to the identified set of the identical redirectable resources on the four or more distinct web pages, wherein the modifying includes prefixing the references to the identical redirectable resources of the identified set with one or more of a literal "parent." or a literal "top" or a reference derived from a "parent." or "top." function, in place of a longer URL location of a distinct instance of a resource of the identified set and wherein the prefixes redirect the references to the identical redirectable resources to a bridging level HTML parent web page; and
providing, on the bridging level HTML parent web page, a reference to the single canonical resource.

19. The method of claim 18, further including providing a browser extension and a table that cross references the identical redirectable resources of the identified set to the single canonical resource.

20. The method of claim 19, further including:
redirecting references to the identical redirectable resources of the identified set to the single canonical resource; and
processing the redirected references as web page content.

21. The method of claim 18, further including providing a browser cache extension and a table that cross references the identical redirectable resources of the identified set to the single canonical resource.

22. The method of claim 21, further including:
redirecting references to the identical redirectable resources of the identified set to the single canonical resource; and
processing the redirected references as cache requests.

* * * * *